United States Patent
Detlefsen (10) Patent No.: US 10,106,328 B2
(45) Date of Patent: Oct. 23, 2018

(54) PLUG SCREW FEEDER, FEEDER ARRANGEMENT AND SYSTEM FOR TREATMENT OF LIGNOCELLULOSIC BIOMASS MATERIAL

(71) Applicant: Valmet AB, Sundsvall (SE)

(72) Inventor: Jan Detlefsen, Alnö (SE)

(73) Assignee: Valmet AB (SE)

( * ) Notice: Subject to any disclaimer, the term of this patent is extended or adjusted under 35 U.S.C. 154(b) by 0 days.

(21) Appl. No.: 15/329,358

(22) PCT Filed: Aug. 31, 2015

(86) PCT No.: PCT/SE2015/050911
§ 371 (c)(1),
(2) Date: Jan. 26, 2017

(87) PCT Pub. No.: WO2016/036300
PCT Pub. Date: Mar. 10, 2016

(65) Prior Publication Data
US 2017/0217687 A1  Aug. 3, 2017

(30) Foreign Application Priority Data
Sep. 2, 2014 (SE) ...................... 1451020

(51) Int. Cl.
*B65G 33/14* (2006.01)
*B65G 33/00* (2006.01)
(Continued)

(52) U.S. Cl.
CPC .............. *B65G 33/30* (2013.01); *B30B 9/121* (2013.01); *B30B 11/246* (2013.01); *B65G 33/14* (2013.01);
(Continued)

(58) Field of Classification Search
None
See application file for complete search history.

(56) References Cited

U.S. PATENT DOCUMENTS 4,583,903 A * 4/1986 Hutchison ............ B65G 65/466
198/676
4,621,968 A * 11/1986 Hutchison ............ B65G 65/466
198/666
(Continued)

FOREIGN PATENT DOCUMENTS

CA         528792 A     8/1956
CN        2921074 Y     7/2007
(Continued)

OTHER PUBLICATIONS

International Search Report for Application No. PCT/SE2015/050911 dated Nov. 27, 2015.
First Search Report for CN2014800315423 dated Jan. 23, 2017.

*Primary Examiner* — Kavel Singh
(74) *Attorney, Agent, or Firm* — Lerner, David, Littenberg, Krumholz & Mentlik, LLP (57) ABSTRACT

A plug screw feeder (1) comprises a plug screw (10) with a thread (12) and a plug screw housing (20) surrounding the plug screw. The plug screw housing comprises an inlet opening (24) in a side of the plug screw and in a vicinity of a first axial end (18) of the plug screw. The plug screw is arranged for feeding lignocellulosic biomass material (99) from the inlet opening to a second axial end (19) of the plug screw when being rotated. The thread, in at least a part of an inlet section (15) of the plug screw, presents a jagged peripheral rim (14A) with an inwards directed leading edge. The inlet section is defined as the section of the plug screw passing the inlet opening during rotation. A feeding arrange- (Continued)

ment and system for treatment of lignocellulosic biomass material comprising such a plug screw feeder is also disclosed.

31 Claims, 5 Drawing Sheets

(51) Int. Cl.
*B65G 33/30* (2006.01)
*D21B 1/26* (2006.01)
*D21C 7/06* (2006.01)
*B65G 33/26* (2006.01)
*B30B 9/12* (2006.01)
*B30B 11/24* (2006.01)

(52) U.S. Cl.
CPC ............ *B65G 33/265* (2013.01); *D21B 1/26* (2013.01); *D21C 7/06* (2013.01)

(56) References Cited

U.S. PATENT DOCUMENTS

| | | | |
|---|---|---|---|
| 4,888,053 A | | 12/1989 | Grayson et al. |
| 5,320,034 A | * | 6/1994 | Eccleston ............... D21B 1/22 100/145 |
| 9,156,221 B2 | * | 10/2015 | Detlefsen ............... D21C 5/00 |

FOREIGN PATENT DOCUMENTS

| | | |
|---|---|---|
| CN | 101397762 A | 4/2009 |
| CN | 101725065 A | 6/2010 |
| CN | 101774556 A | 7/2010 |
| CN | 201864303 U | 6/2011 |
| CN | 202000187 U | 10/2011 |
| DE | 202007007033 U1 | 7/2007 |
| EP | 0336702 A2 | 10/1989 |
| EP | 0612465 A1 | 8/1994 |
| JP | S5216274 A | 2/1977 |
| JP | 2004203641 A | 7/2004 |
| WO | 2013126007 A1 | 8/2013 |

* cited by examiner

PLUG SCREW FEEDER, FEEDER ARRANGEMENT AND SYSTEM FOR TREATMENT OF LIGNOCELLULOSIC BIOMASS MATERIAL

CROSS-REFERENCE TO RELATED PATENT APPLICATIONS

The present application is a national phase entry under 35 U.S.C. § 371 of International Application No. PCT/SE2015/050911 filed Aug. 31, 2015, published in English, which claims priority from Swedish Application No. 1451020-0 filed Sep. 2, 2014, all of which are incorporated herein by reference.

TECHNICAL FIELD

The present document relates in general to feeder arrangements and in particular to plug screw feeders, feeder arrangements and systems for treatment of lignocellulosic biomass material.

BACKGROUND

I industries processing lignocellulosic biomass material, such as wood chips, herbaceous plants, straw, bagasse etc., transport arrangements are of high importance. The feeding of the lignocellulosic biomass material to be processed or have been processed depends on many factors. The nature of the lignocellulosic biomass material, such as fibre length, water content, density etc., give rise to different requirements as well as the properties of the treatments performed before and/or after the transporting.

Plug screw feeders, in which a rotating screw transports the material forward is a commonly used type of feeder in fibrous material processing, in particular for lignocellulosic biomass material. At the same time as the material is fed to a next stage, the screw and associated screw pipe or housing also exercises a volumetric compression function. The lignocellulosic biomass material is typically provided through an inlet opening in the side of the plug screw feeder, close to the rear end.

In a basic set-up and in particular when the lignocellulosic material consists of wood chips or other denser materials, the lignocellulosic biomass material can simply be provided through the inlet opening by gravitational forces. However, when handling straw and other materials of low density and if a well reproducible high density is requested at the front end of the plug screw feeder, forced feeding may be employed. Examples of such force-feeding can be found in e.g. the U.S. Pat. No. 5,320,034 or in the published International patent application WO 2013/126007 A1. The material leaving the front end is in certain applications requested to have a high density. For instance, when feeding lignocellulosic biomass material into a digester, operating at high pressures, it is requested that the front end material volumes themselves provides a sealing for the high pressure. There is thus a need for a high, uniform and reliable compression of the lignocellulosic biomass material during the feeding through the plug screw feeder.

One problem that might occur using prior art plug screw feeders, in particular for fibrous material having relatively long fibres, e.g. in lignocellulosic biomass material, is that the operation of the plug screw feeder becomes irregular. The actual feeding into and within the plug screw feeder seems to be provided intermittently or jerkily. The plug screw feeder tends to be exposed for repeated short periods of very high stress and the overall compression result becomes deteriorated. It is e.g. common that the achieved compression in the material presented at the front end differs considerably in a circumferential direction. Also the power requirements of the plug screw feeder becomes irregular, which require high safety margins.

There is thus a need for an improved feeding arrangement suitable for all kinds of lignocellulosic biomass material.

RELATED BACKGROUND

JPS 5216274 U presents a horizontal feeding arrangement based on a plug screw with a thread. Material is allowed to fall into the plug screw from above. The thread of the entire screw has a jagged peripheral rim.

EP 0 336 702 A2 discloses cold feed rubber extruder comprising a screw in a barrel, having a feed-inlet, a compression section, a plasticizing section and an exit section. The screw is provided with notches cut across the screw-flights, at a lead-angle greater than that of the flights, for providing a positive pulling in and forward transport of fresh feed.

CA 528792 A discloses a blender for extruding purposes, in particular for use with plastic material. Ridges of the threads are provided adjacent a hopper with a plurality of notches.

SUMMARY

A general object of the present technology is to provide devices and system for improving the feeding of lignocellulosic biomass material through a plug screw feeder.

This object is achieved by plug screw feeders, feeder arrangements and systems for treatment of lignocellulosic biomass material according to the attached patent claims. Preferred embodiments are defined in dependent claims. In general words, in a first aspect, a plug screw feeder comprises a plug screw with a thread and a plug screw housing surrounding the plug screw. The plug screw housing comprises an inlet opening in a side parallel to the plug screw and in a vicinity of a first axial end of the plug screw. The plug screw is arranged for feeding lignocellulosic biomass material from the inlet opening to a second axial end, opposite to the first axial end, of the plug screw when being rotated. The thread, in at least a part of an inlet section of the plug screw, presents a jagged peripheral rim. The inlet section is defined as the section of the plug screw passing the inlet opening during rotation. The peripheral rim comprises teeth in the at least a part of the inlet section. The sections of the peripheral rim, in the at least a part of the inlet section, have a surface normal having a radial component pointing inwards.

In a second aspect, a feeding arrangement comprises a plug screw feeder according to the first aspect and a force-feeding screw arranged to provide the lignocellulosic biomass material to the inlet section of the plug screw feeder.

In a third aspect, a system for treatment of lignocellulosic biomass material comprises a plug screw feeder according to the first aspect and a treatment vessel. The plug screw feeder is arranged to feed the lignocellulosic biomass material into the treatment vessel.

One advantage with the presently presented technology is that the plug screw feeder presents a much more even operation and in that the produced compressed lignocellulosic biomass material leaving the plug screw feeder has improved compression, particular in terms of homogeneity and predictability. Further advantages are discussed in connection with embodiments described further below.

BRIEF DESCRIPTION OF THE DRAWINGS

The invention, together with further objects and advantages thereof, may best be understood by making reference to the following description taken together with the accompanying drawings, in which.

DETAILED DESCRIPTION

Throughout the drawings, the same reference numbers are used for similar or corresponding elements.

In the context of the present invention, the term "plug screw feeder" relates to a feeder comprising a screw or similar rotating means and which is capable of feeding or transporting lignocellulosic material through the feeder at increased or maintained density of the material and that creates an essentially gas- and fluid-tight plug of the lignocellulosic material towards the end of the feeder. For example, according to an embodiment of such a plug screw feeder, a cross-sectional area of the circular housing of the feeder and the screw diameter decreases in the feeding direction thereby so as to create a decreasing space between the screw and the housing and thus resulting in an essentially gas- and fluid-tight plug of the lignocellulosic material towards the end of the feeder. According to another embodiment of a plug screw feeder, the cross-sectional area of the circular housing of the feeder is constant while and the screw diameter and screw axis increases in the feeding direction thereby creating a decreasing space between the screw and the housing and thus resulting in an essentially gas- and fluid-tight plug of the lignocellulosic material towards the end of the feeder. As the skilled person realizes, there are other embodiments of feeders that achieves this purpose and thus are included within the definition of the term "plug screw feeder".

Figure 1:
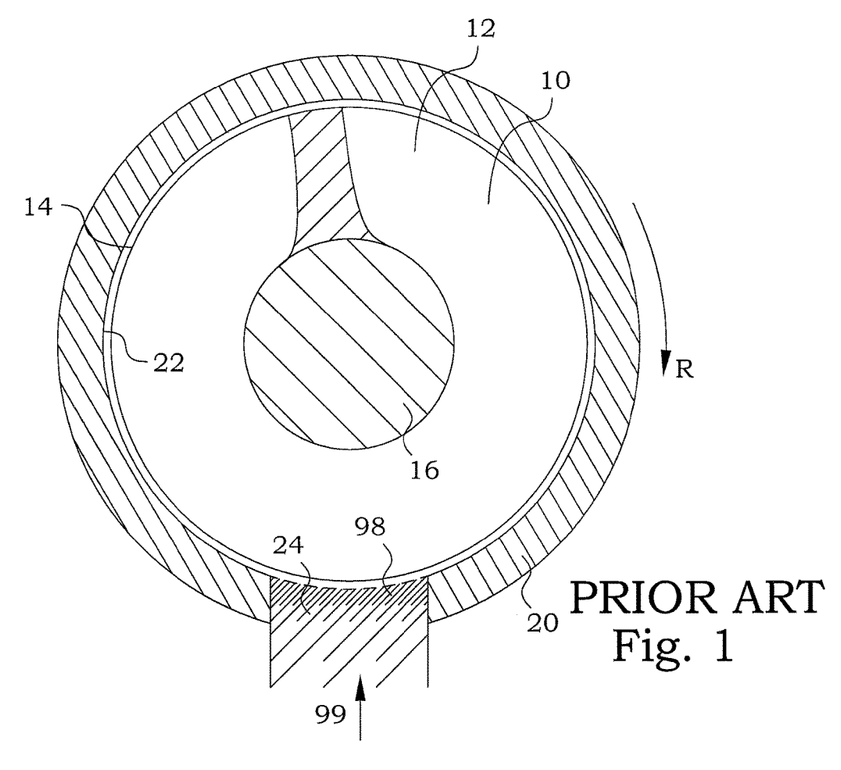
FIG. 1 is schematic cross-sectional view of a prior art plug screw feeder.

After thorough investigations, the origin of the problems with irregular plug screw feeder operation was localized to the inlet to the plug screw feeder. FIG. 1 illustrates a part of a prior-art plug screw 10 in a cross-sectional view across the axis with somewhat less than one full thread 12 turn illustrated. The intended rotation direction around a shaft 16 is denoted by an arrow R. The rim 14 of the thread 12 follows essentially the inner surface 22 of a plug screw housing 20. An inlet opening 24 of the plug screw housing 20 is provided in a side parallel to the plug screw 10. Fibrous material, in particular lignocellulosic biomass material 99 is provided to the inlet opening 24, optionally in a forced manner. The rim 14 of the thread 12 passes the inlet opening 24 and it is intended that parts of the lignocellulosic biomass material 99 should be pushed into the voids between the thread. When the plug screw 10 is relatively new and sharp, the rim 14 may scratch off some of the lignocellulosic biomass material from the inlet opening and bring it into the rotation of the plug screw. However, it has been found that, in particular when the thread 12 of the plug screw 10 becomes worn, the action of the rim 14 may instead be to push back the lignocellulosic biomass material towards the inlet opening 24. The result may be a cake 98 of denser lignocellulosic biomass material at the inlet opening. When the force on this cake 98 eventually becomes large enough, a large piece of the cake will simultaneously enter into the plug screw 10. This is the main reason for the experienced irregularities in operation. This tendency of jerky input of lignocellulosic biomass material into the plug screw 10 is typically increased when long fibres are to be transported.

Furthermore, since the transport of lignocellulosic biomass material within the plug screw 10 is mainly axially directed, and since the lignocellulosic biomass material essentially is deposited in the part of the plug screw 10 closest to the inlet opening 10, the distribution of lignocellulosic biomass material around the shaft 16 becomes uneven, resulting in a non-homogeneous compression at the output end of the plug screw 10.

Figure 2:
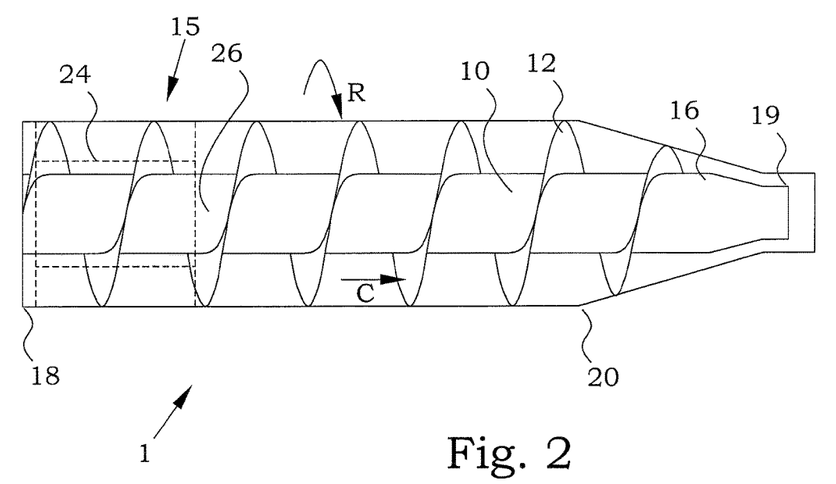
FIG. 2 is a schematic view of an embodiment of a general plug screw feeder.

FIG. 2 illustrates schematically an embodiment of a plug screw feeder 1 in a cross-sectional view along the shaft 16. The plug screw feeder 1 comprises a plug screw 10 with a thread 12. A plug screw housing 20 surrounds the plug screw 10. The plug screw housing 20 comprises an inlet opening 24 in a side 26 parallel to the plug screw 10 and in a vicinity of a first axial end 18 of the plug screw 10. The plug screw 10 is arranged for feeding fibrous material, in particular lignocellulosic biomass material, from the inlet opening 24 to a second axial end 19, opposite to the first axial end 18, of the plug screw 10 when being rotated. The feeding direction is denoted by C and the rotation is denoted by R. In order to understand the basic ideas of the technology presented herein, an inlet section 15 of the plug screw 10 is defined as the section of the plug screw 10 passing the inlet opening 24 during rotation of the plug screw 10.

Figure 3:
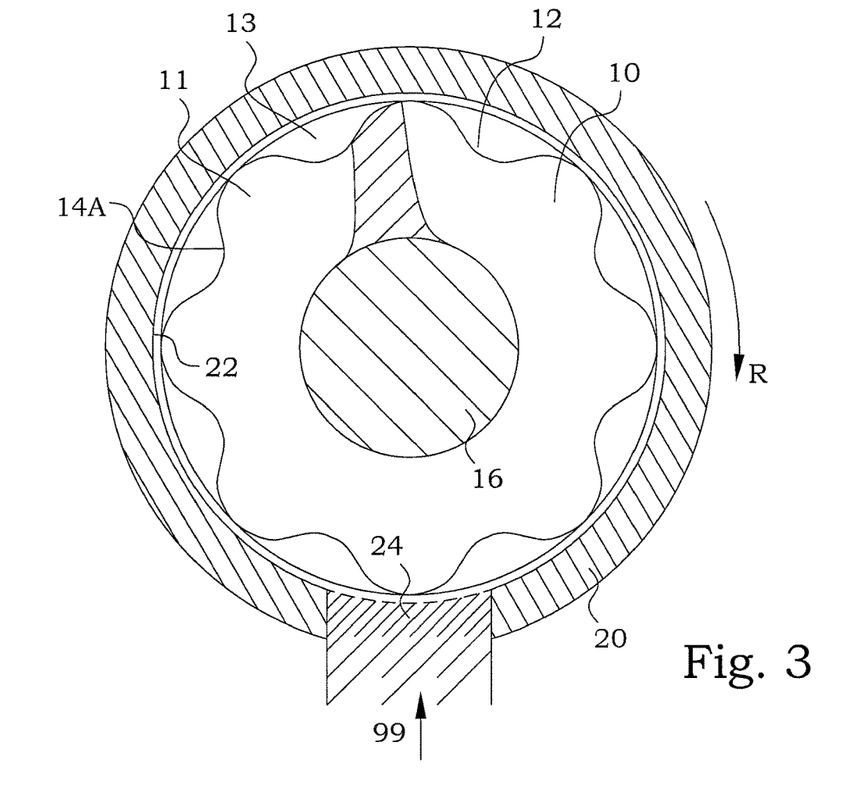
FIG. 3 is schematic cross-sectional view of an example of a plug screw feeder.

FIG. 3 illustrates an example of a plug screw 10 in a cross-sectional view taken across the shaft 16 of the plug screw 10 within the inlet section 15 of the plug screw 10. The inner surface 22 of the plug screw housing within the inlet opening area is indicated by a broken line. The rim 14A of the thread 12 of the plug screw 10 is seen to have an undulating shape. In other words, the thread 12 presents, in at least a part of the inlet section 15 of the plug screw 10, a jagged peripheral rim 14A. The result of such a jagged peripheral rim 14A is that the pressure that the rim of the plug screw exerts on fibrous material waiting at the inlet opening to be entered varies in time and space. This variation in contact pressure assists in breaking up any cakes that may be formed at the inlet, and the flow of lignocellulosic biomass material through the inlet opening becomes more continuous.

In a particular embodiment, the peripheral rim 14A, in the above mentioned part of the inlet section, comprises teeth 11. Between these teeth 11, void volumes 13 are provided, presenting free space between the plug screw 10 and the inner surface 22 of the plug screw housing. The lignocellulosic biomass material entering the inlet opening may to a part enter into the void volumes 13. That material will thereby be given a rotational motion around the shaft 16. The result of such additional motion of the lignocellulosic biomass material is that the lignocellulosic biomass material becomes more evenly spread around the shaft 16.

The principles described here above can be applied to all kinds of plug screw feeders and all kinds of lignocellulosic biomass material. The biomass material includes, for example, wood-based raw materials such as wood chips, sawdust, chipped or hammer-milled forest residuals, agricultural residues such as bagasse, sugar cane straw, wheat straw, corn stover, corn cobs, and oil palm fruit residuals (so-called empty fruit bunches). Other types of lignocellulosic biomass material that can be used in accordance with the present invention include grasses, reeds and energy canes.

Figure 4:
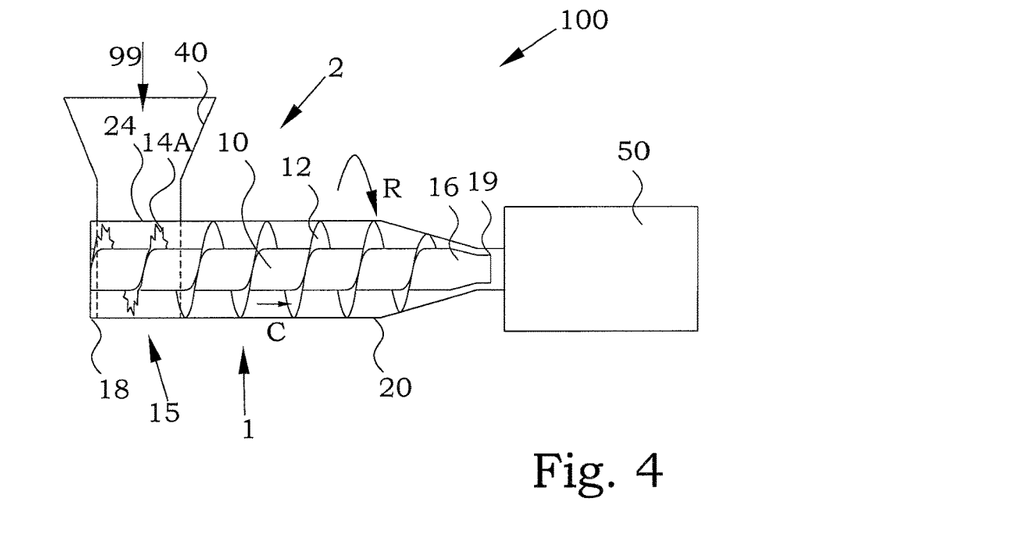
FIG. 4 is a schematic illustration of an embodiment of a system for treatment of lignocellulosic biomass material.

FIG. 4 is a schematic illustration of an embodiment of a system 100 for treatment of lignocellulosic biomass material. The system comprises a plug screw feeder 1 according to the principles described in any embodiment in the present disclosure. A feeding arrangement 2 comprises in this embodiment the plug screw feeder and an inlet arrangement 40. In this particular embodiment, the plug screw feeder 1 is fed by lignocellulosic biomass material through the inlet arrangement 40 comprising a chute in which lignocellulosic biomass material 99 is allowed to fall down into the inlet opening 24 by use of its own weight. The system 100 further comprises a high-pressure treatment vessel 50, such as a reactor for treatment of biomass material though cooking or hydrolysis. The plug screw feeder 1 is arranged to feed the lignocellulosic biomass material 99 into the treatment vessel 50.

In case the treatment vessel e.g. is a digester or a reactor for hydrolysis, there might be an overpressure within the treatment vessel 50. Overpressures in the order of 1-40 bars are not uncommon. The plug screw feeder 1 therefore preferably has to provide a compression of the lignocellulosic biomass material at the end of the plug screw feeder that is high enough to withstand treatment vessel operating at an overpressure of e.g. 1-40 bars.

Figure 5:
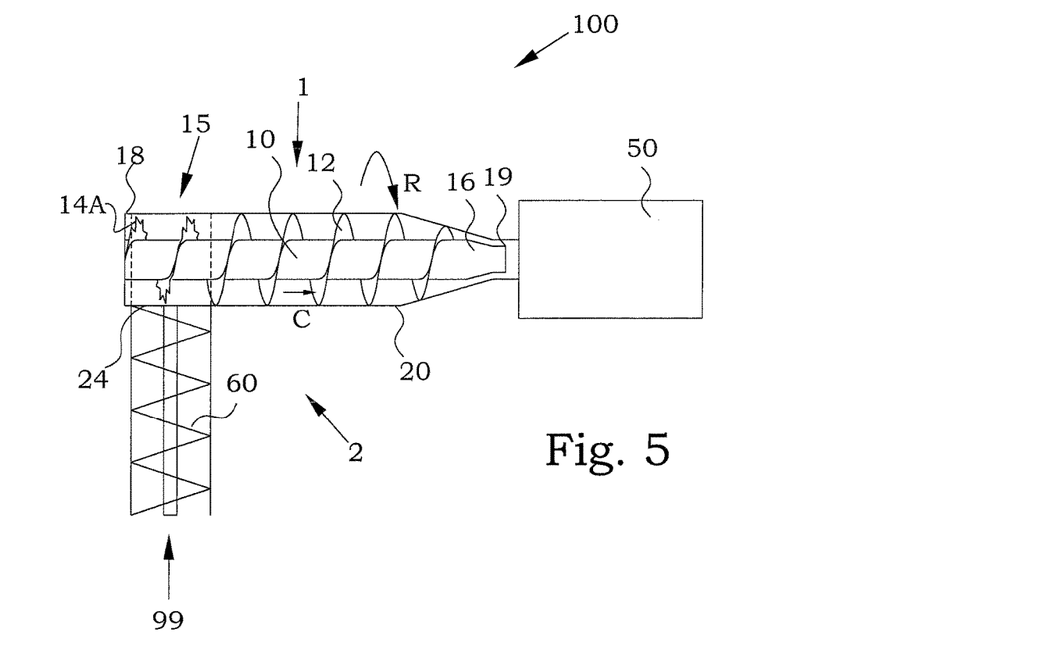
FIG. 5 is a schematic illustration of another embodiment of a system for treatment of lignocellulosic biomass material.

FIG. 5 illustrates schematically another embodiment of a system 100 for treatment of lignocellulosic biomass material. Most parts are similar to the ones illustrated in FIG. 4. However, in this embodiment a forced feeding of lignocellulosic biomass material is employed. The system is therefore illustrated as seen from above. The feeding arrangement 2 here comprises a plug screw feeder 1 according to any of the embodiments presented in the present disclosure, and a force-feeding screw 60. The force-feeding screw 60 is arranged to provide the lignocellulosic biomass material 99 to the inlet section 15 of said plug screw feeder 1. The force-feeding screw 60 may be another plug screw or any other type of feeding screw arrangement.

The actual shape of the peripheral rim of the thread of the plug screw can be designed in different ways. The preferred embodiment depends e.g. on the composition of the lignocellulosic biomass material to be treated, the size of the arrangements, the required lignocellulosic biomass material compression, the operating speed of the plug screw etc. Some non-limiting examples of designs are discussed here below.

Figure 6:
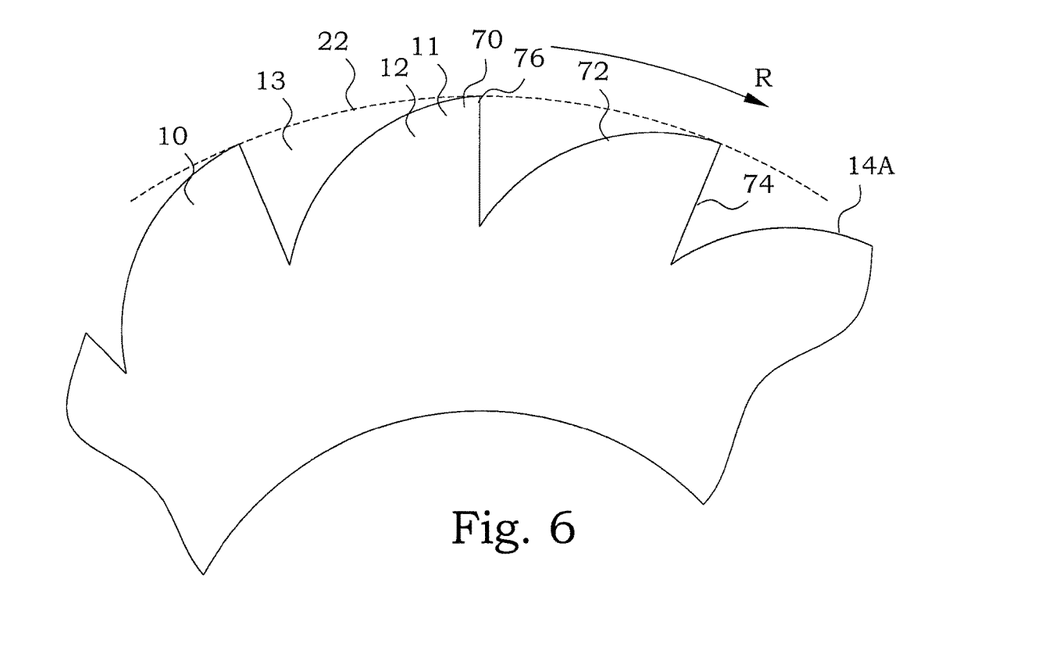
FIG. 6 is a schematic illustration of parts of an example of a plug screw thread.

In FIG. 6 a part of an example of a plug screw thread is schematic illustrated. The illustrated section is provided in at least a part of an inlet section of the plug screw. The rotation direction is denoted by R. The peripheral rim 14A here presents a number of teeth-like structures, having a respective tip 70. In connection with the tip 70, the peripheral rim 14A has a leading edge 74 that is steeper than the trailing edge 72.

Figure 7:
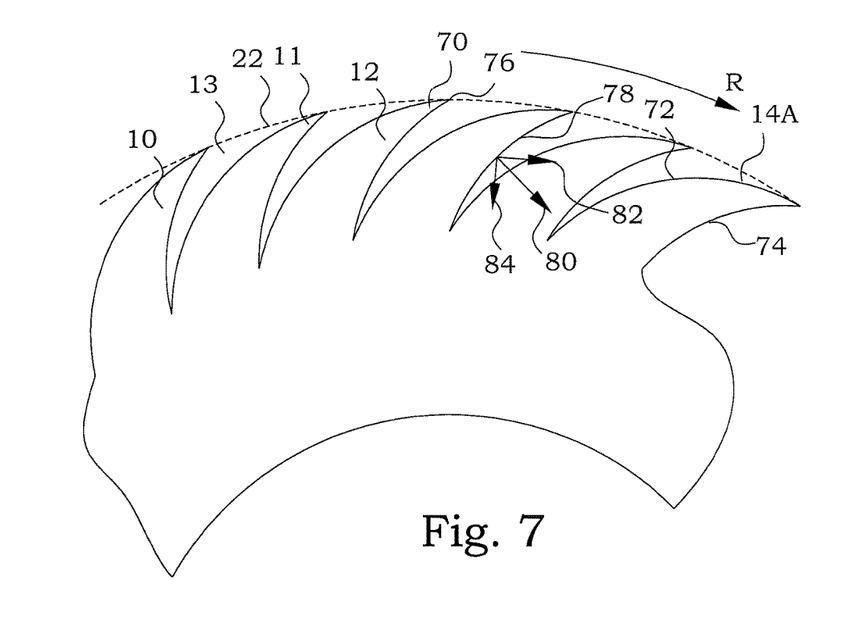
FIGS. 7-9 are schematic illustrations of parts of embodiments of plug screw threads.

In FIG. 7 a part of an embodiment of a plug screw thread, particularly advantageous for lignocellulosic biomass material, is schematic illustrated. The illustrated section is, in analogy with above, provided in at least a part of an inlet section of the plug screw. The rotation direction is denoted by R. In this embodiment, the peripheral rim 14A is given a claw-like shape. The tips 70 are provided with sharp cutting edges 76. Fibres positioned in the inlet opening will be scratched off grabbed by the tip 70. A sharp cutting edge may also contribute by actually cutting long fibres into shorter pieces, which also facilitates the following compression. The void volumes 13 allow lignocellulosic biomass material to be brought around in the rotational direction, distributing the lignocellulosic biomass material around the shaft of the plug screw. A section 78 of the peripheral rim 14A, in this embodiment the leading edge, is given a surface normal 80. The surface normal 80 has one radial component 84 and one tangential component 82. In this embodiment, the radial component points inwards, towards the centre of the plug screw. In other words, the leading edge has a surface that is directed partly inwards. This provides good possibilities to achieve sharp cutting edges that may tear off portions of lignocellulosic biomass material from the inlet opening.

The inwards directed leading edges thus provide an operation that is particularly advantageous for lignocelulosic biomass material. Such material often incorporates fibrous material. The fibrous material to be entered into the plug screw feeder is typically grabbed by the tip 70. By the section 78, the fibrous material is drawn towards the centre of the screw and is thereby pulled out from the volume of material that is waiting to be entered. The inwards directed leading edges thus contributes not only to a cutting at the tip 70, but contributes also to pull out the fibrous material, that is not directly cut, through the inlet. This assists in achieving a more uniform material entering rate. Since the fibres are generally elongated, the fibres may not be entirely housed between the threads, which eventually additionally assists the tip 70 to cut also the pulled lignocelulosic biomass material into smaller pieces.

Figure 8:
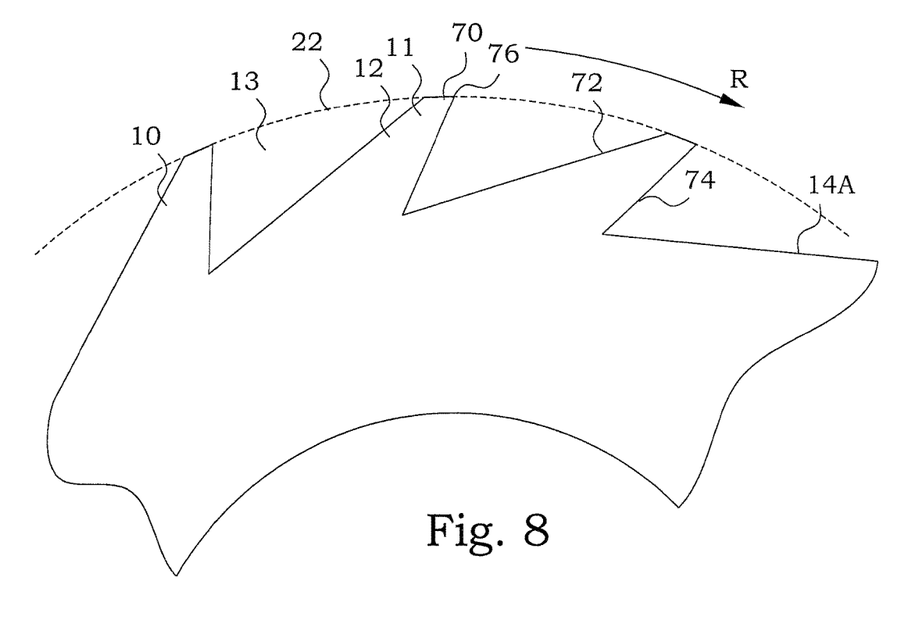

In FIG. 8 a part of another embodiment of a plug screw thread is schematic illustrated. The illustrated section is, in analogy with above, provided in at least a part of an inlet section of the plug screw. The rotation direction is denoted by R. In this embodiment, a cutting edge 76 is provided by linear cuts into a general circular shape. The cutting edges 76 in this embodiment becomes relatively rigid and the void volumes 13 between the tips 70 are relatively large to be able to transport relatively large volumes of fibres by the operation of the inwards directed leading edge 74.

Figure 9:
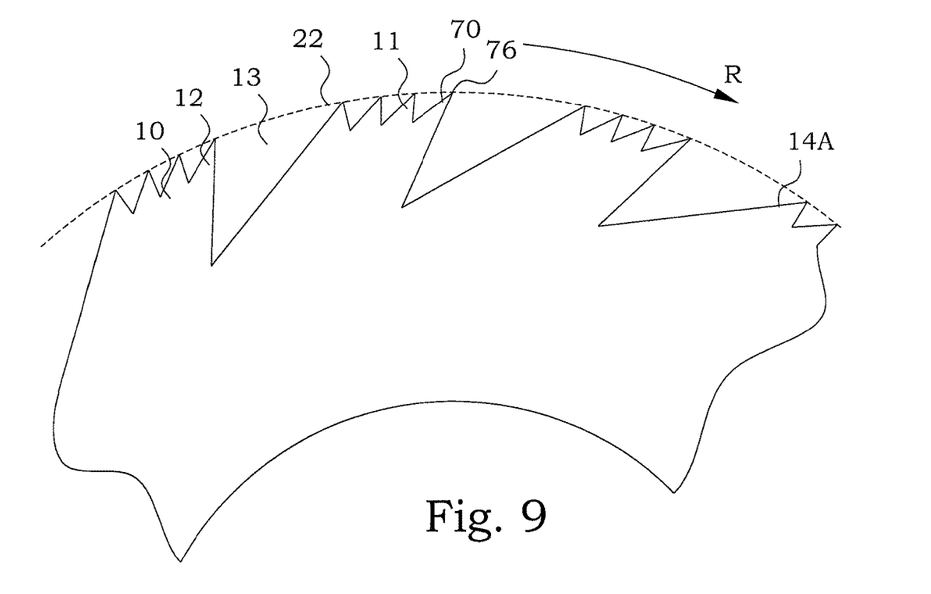

The embodiment above have all been based on a single repeated shape. However, different kinds of shapes, can be combined on one and the same plug screw. FIG. 9 illustrates one example, where groups of sharp tips 70 with cutting edges 76 are separated by a larger void volume 13. The sharp tips 70 are intended to cut the surface of fibrous material, in particular lignocellulosic biomass material, provided at the inlet opening to facilitate the release of a larger portion that can be brought into the plug screw by the following void volume 13 and the inwards directed leading edge 74.

It is easily understood that the jagged peripheral rim can have a shape in which tips, cutting edges and void volumes are provided in any shape and relative distance. The jagged peripheral rim can even be totally without any regular shapes, but may consist of irregular tips and edges.

Figure 10:
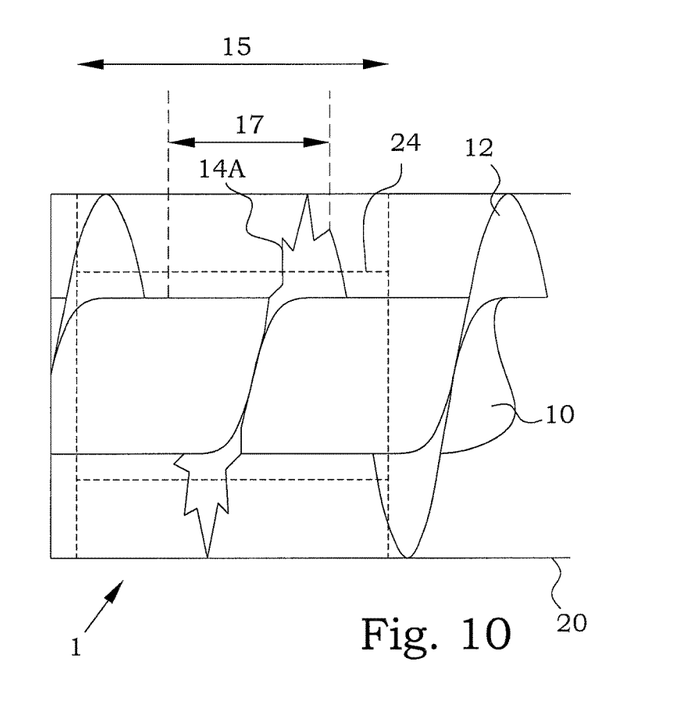
FIG. 10 is an illustration of an extension of an inlet section.

FIG. 10 illustrates an inlet section of an embodiment of a plug screw. The jagged peripheral rim 14A is provided over a portion 17 of the inlet section 15 of the plug screw 10. As mentioned above, the inlet section 15 is defined as the part of the plug screw that passes the inlet opening 24 during rotation of the plug screw. In a preferred embodiment, the portion 17 with jagged peripheral rim 14A covers the entire inlet section 15. In other words, the thread 12 presents the jagged peripheral rim 14A in the entire inlet section 15. It might, however, be useful to have smaller and shallower structures in the peripheral rim 14A closer to the front end, in the transport direction, of the inlet opening, in order to avoid jamming material between the plug screw and the plug screw housing 20.

For similar reasons, in a preferred embodiment, the jagged peripheral rim 14 does not extend beyond the inlet section 15, i.e. the portion 17 should be kept within the inlet section 15. In other words, the thread 12 has, outside the inlet section 15, a rim following an inner surface of the plug screw housing 20. This is also to avoid to jam lignocellulosic biomass material between the plug screw 10 and the plug screw housing 20.

The thread of the plug screw has a certain pitch or pitch distribution. The pitch is defined as the distance between two consecutive turns of the thread. The preferred pitch is mainly determined by the requirements of compression, plug screw rotational speed, total feeding volume rate etc. Sometimes, such requirements give a thread pitch that is smaller than the fibre length of the material that is to be transported, e.g. lignocellulosic biomass material, which in prior art increased the risk for jamming. However, using the presented plug screw with jagged peripheral rim, such problems are dramatically reduced. As indicated above, it could even be an advantage to have a thread that has a pitch that is smaller than a maximum extension of the lignocellulosic biomass material when the lignocellulosic biomass material enters the inlet section. Since the jagged peripheral rim provides not only a transporting action, but typically also a cutting action on the lignocellulosic biomass material, the resulting output lignocellulosic biomass material typically has a reduced fibre length as compared to the incoming material. This is very advantageous in many applications, such as in digestion or hydrolysis arrangements.

The embodiments described above are to be understood as a few illustrative examples of the present invention. It will be understood by those skilled in the art that various modifications, combinations and changes may be made to the embodiments without departing from the scope of the present invention. In particular, different part solutions in the different embodiments can be combined in other configurations, where technically possible. The scope of the present invention is, however, defined by the appended claims.

The invention claimed is:

1. A plug screw feeder for lignocellulosic biomass material, comprising:
   a plug screw having a first axial end, a second axial end, and a thread;
   a plug screw housing having an inner surface surrounding said plug screw whereby said lignocellulosic biomass material is compressed within said housing;
   said plug screw housing comprising an inlet opening in a side parallel to said plug screw and in a vicinity of said first axial end of said plug screw;
   wherein said plug screw is arranged for feeding lignocellulosic biomass material from said inlet opening to said second axial end, opposite to said first axial end, of said plug screw when being rotated;
   said thread, in at least a part of an inlet section of said plug screw, presenting a jagged peripheral rim;
   wherein said inlet section is the section of said plug screw passing said inlet opening during rotation;
   wherein said jagged peripheral rim, in said at least a part of said inlet section, comprises teeth; and
   wherein sections of said jagged peripheral rim, in said at least a part of said inlet section, have a surface normal having a radial component pointing inwards.

2. The plug screw feeder according to claim 1, wherein said jagged peripheral rim, in said at least a part of said inlet section, forms tips which, in a rotational direction, includes a leading edge and a trailing edge, said leading edge being steeper than said trailing edge.

3. The plug screw feeder according to claim 2, wherein at least one of said tips comprises a cutting edge.

4. The plug screw feeder according to claim 1, wherein said thread presents said jagged peripheral rim in the entirety of said inlet section.

5. The plug screw feeder according to claim 1, wherein said thread has, outside said inlet section, a rim following said inner surface of said plug screw housing.

6. The plug screw feeder according to claim 1, wherein said thread has a pitch that is smaller than a maximum extension of said lignocellulosic biomass material when said lignocellulosic biomass material enters said inlet section.

7. The plug screw feeder according to claim 1, in combination with a treatment vessel, said plug screw feeder being arranged to feed said lignocellulosic biomass material into said treatment vessel.

8. The plug screw feeder according to claim 7, wherein said treatment vessel operates at an overpressure of 1-40 bars.

9. The plug screw feeder according to claim 7, further comprising a feeding arrangement comprising said plug screw feeder and a force-feeding screw arranged t provide said lignocellulosic biomass material to said inlet section of said plug screw feeder.

10. The plug screw feeder according to claim 7, where at least one of said tips comprises a cutting edge.

11. The plug screw feeder according to claim 7, wherein said jagged peripheral rim in said at least a part of said inlet section forms tips, which in a rotational direction, include a leading edge and a trailing edge, said leading edge being steeper than said trailing edge.

12. The plug screw feeder according to claim 11, wherein at least one of said tips comprises a cutting edge.

13. The plug screw feeder according to claim 7, wherein said thread presents said jagged peripheral rim in the entirety of said inlet section.

14. The plug screw feeder according to claim 7, wherein said thread has a rim following said inner surface of said plug screw housing outside of said inlet section.

15. The plug screw feeder according to claim 7, wherein said thread has a pitch that is smaller than a maximum extension of said lignocellulosic biomass material when said lignocellulosic biomass material enters said inlet section.

16. A feeding arrangement comprising:
   a plug screw feeder having:
      a plug screw having a first axial end, a second axial end, and a thread;
      a plug screw housing having an inner surface surrounding said plug screw whereby said lignocellulosic biomass material is compressed within said housing;
      said plug screw housing comprising an inlet opening in a side parallel to said plug screw and in a vicinity of said first axial end of said plug screw;
      wherein said plug screw is arranged for feeding lignocellulosic biomass material from said inlet opening to said second axial end, opposite to said first axial end, of said plug screw when being rotated;

said thread, in at least a part of an inlet section of said plug screw, presenting a jagged peripheral rim;

wherein said inlet section is the section of said plug screw passing said inlet opening during rotation;

wherein said jagged peripheral rim, in said at least a part of said inlet section, comprises teeth; and wherein sections of said jagged peripheral rim, in said at least a part of said inlet section, have a surface normal having a radial component pointing inwards; and a force-feeding screw arranged to provide said lignocellulosic biomass material to said inlet section of said plug screw feeder.

17. The feeding arrangement according to claim 16, wherein said jagged peripheral rim, in said at least a part of said inlet section, forms tips which, in a rotational direction, include a leading edge and a trailing edge, said leading edge being steeper than the trailing edge.

18. The feeding arrangement according to claim 16, wherein said thread presents said jagged peripheral rim in the entirety of said inlet section.

19. The feeding arrangement according to claim 16, wherein said thread has, outside said inlet section, a rim following said inner surface of said plug screw housing.

20. The feeding arrangement according to claim 16, wherein said thread has a pitch that is smaller than a maximum extension of said lignocellulosic biomass material when said lignocellulosic biomass material enters said inlet section.

21. A plug screw feeder for lignocellulosic biomass material, comprising:

a plug screw having a first axial end, a second axial end, and a thread;

a plug screw housing having an inner surface surrounding said plug screw whereby said lignocellulosic biomass material is compressed within said housing;

said plug screw housing comprising an inlet opening in a side parallel to said plug screw and in a vicinity of said first axial end of said plug screw;

wherein said plug screw is arranged for feeding lignocellulosic biomass material from said inlet opening to said second axial end, opposite to said first axial end, of said plug screw when being rotated;

said thread, in at least a part of an inlet section of said plug screw, presenting a jagged peripheral rim within the plane of the thread;

wherein said inlet section is the section of said plug screw passing said inlet opening during rotation;

wherein said jagged peripheral rim, in said at least a part of said inlet section, comprises teeth; and wherein sections of said jagged peripheral rim, in said at least a part of said inlet section, have a surface normal having a radial component pointing inwards.

22. The plug screw feeder according to claim 21, wherein said jagged peripheral rim, in said at least a part of said inlet section, forms tips which, in a rotational direction, includes a leading edge and a trailing edge, said leading edge being steeper than said trailing edge.

23. The plug screw feeder according to claim 22, wherein at least one of said tips comprises a cutting edge.

24. The plug screw feeder according to claim 21, wherein said thread presents said jagged peripheral rim in the entirety of said inlet section.

25. The plug screw feeder according to claim 21, wherein said thread has, outside said inlet section, a rim following said inner surface of said plug screw housing.

26. The plug screw feeder according to claim 21, wherein said thread has a pitch that is smaller than a maximum extension of said lignocellulosic biomass material when said lignocellulosic biomass material enters said inlet section.

27. A feeding arrangement comprising:

a plug screw feeder having:

a plug screw having a first axial end, a second axial end, and a thread;

a plug screw housing having an inner surface surrounding said plug screw whereby said lignocellulosic biomass material is compressed within said housing;

said plug screw housing comprising an inlet opening in a side parallel to said plug screw and in a vicinity of said first axial end of said plug screw;

wherein said plug screw is arranged for feeding lignocellulosic biomass material from said inlet opening to said second axial end, opposite to said first axial end, of said plug screw when being rotated;

said thread, in at least a part of an inlet section of said plug screw, presenting a jagged peripheral rim within the plane of the thread;

wherein said inlet section is the section of said plug screw passing said inlet opening during rotation;

wherein said jagged peripheral rim, in said at least a part of said inlet section, comprises teeth; and wherein sections of said jagged peripheral rim, in said at least a part of said inlet section, have a surface normal having a radial component pointing inwards; and a force-feeding screw arranged to provide said lignocellulosic biomass material to said inlet section of said plug screw feeder.

28. The feeding arrangement according to claim 27, wherein said jagged peripheral rim, in said at least a part of said inlet section, forms tips which, in a rotational direction, include a leading edge and a trailing edge, said leading edge being steeper than the trailing edge.

29. The feeding arrangement according to claim 27, wherein said thread presents said jagged peripheral rim in the entirety of said inlet section.

30. The feeding arrangement according to claim 27, wherein said thread has, outside said inlet section, a rim following said inner surface of said plug screw housing.

31. The feeding arrangement according to claim 27, wherein said thread has a pitch that is smaller than a maximum extension of said lignocellulosic biomass material when said lignocellulosic biomass material enters said inlet section.

\* \* \* \* \*